Patented Dec. 27, 1938

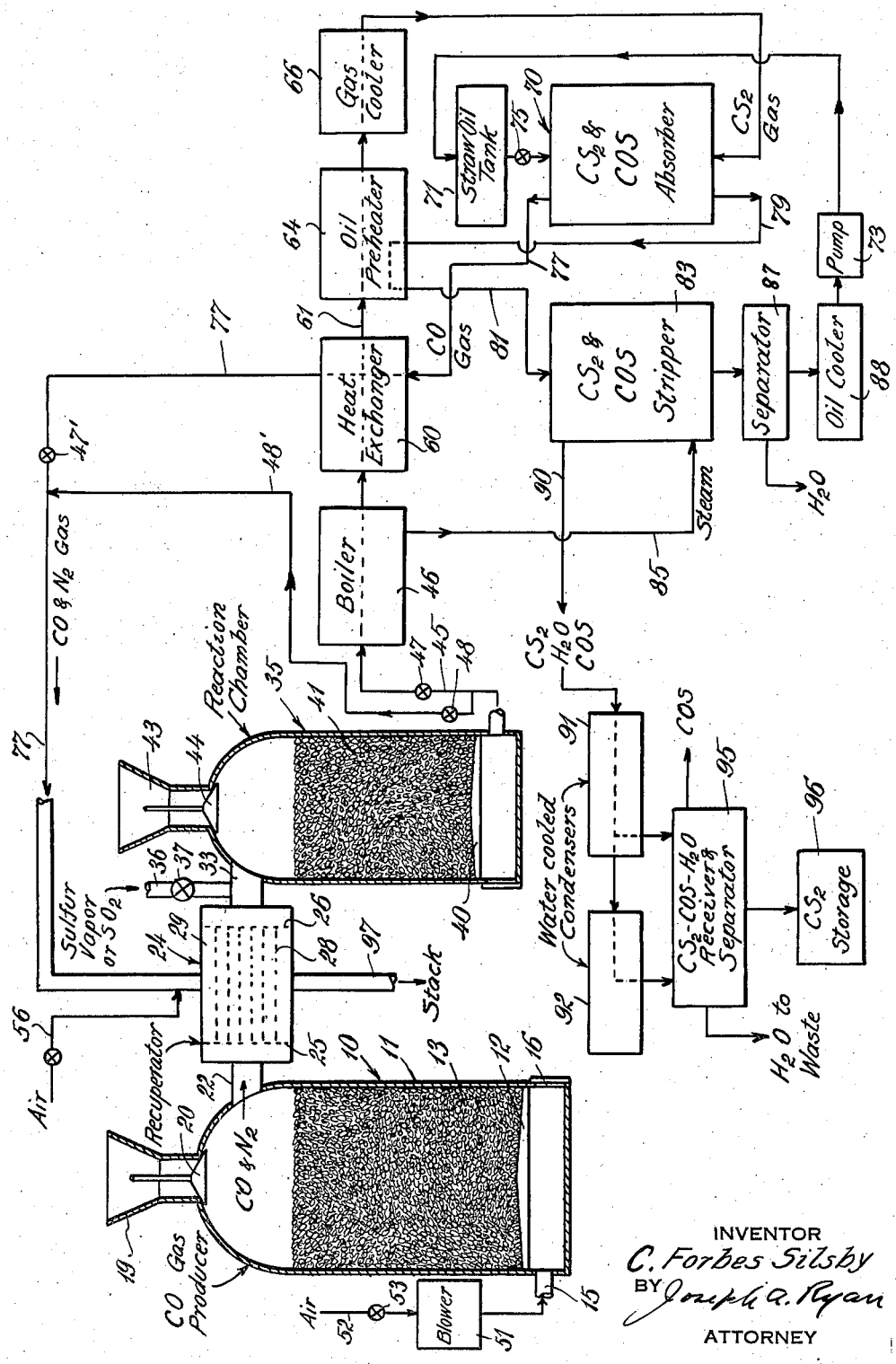

2,141,768

UNITED STATES PATENT OFFICE 2,141,768

MANUFACTURE OF CARBON BISULPHIDE

Charles Forbes Silsby, White Plains, N. Y., assignor to General Chemical Company, New York, N. Y., a corporation of New York Application October 20, 1937, Serial No. 169,969

7 Claims. (Cl. 23—206)

This invention relates to the manufacture of carbon bisulphide and is more particularly directed to production of carbon bisulphide by reacting sulphur in the form of vapor or sulphur dioxide with solid carbonaceous material.

Production of carbon bisulphide by reacting sulphur in the form of vapor or sulphur dioxide gas with carbon has been proposed. In commercial practice, however, only certain types of solid carbonaceous material may be used because, as is well known in the art, all forms of carbon are not sufficiently active to combine economically with sulphur. Metallurgical coke is an example of an insufficiently active form of carbon. The carbonaceous material largely used in commercial practice is wood charcoal, a relatively expensive material. Acid sludges constituting waste products of hydrocarbon oil refining processes in which sulphur acid is used may be decomposed by heating to produce relatively large amounts of sulphur dioxide gas and substantial quantities of solid carbonaceous coke-like residues. It has recently been found that such acid sludge coke, when containing little or no volatile matter, is a particularly active type of carbonaceous material and may also be used to substantial commercial advantage as a source of carbon in the manufacture of carbon bisulphide. On account of the relative scarcity of carbonaceous materials suitable for use in the manufacture of carbon bisulphide, it will be appreciated that such materials demand a premium on the market.

In the past, carbon bisulphide has been commonly produced by reacting sulphur vapor and wood charcoal at high temperatures, e. g., around 1450–1650° F., in externally heated pots or retorts. Such retorts are pear-shaped and small, being generally not more than about 30 inches in diameter. It has been impractical to make the retorts much larger because the high external temperatures required to force the necessary heat to the center of the reaction mass would be prohibitive. The retorts have been made of cast iron and are relatively short-lived on account of the deteriorating effects of the high temperatures externally applied and the corrosive effects of sulphur and carbon bisulphide produced. Furthermore, large numbers of such retorts are required to obtain production of carbon bisulphide in commercial quantities. Consequently, installation and maintenance costs are high, retort replacements constituting a large item of operating costs. Regardless of the form in which sulphur is introduced, whether as sulphur vapor or sulphur dioxide, supply of heat to the reaction is a problem always confronting the operator.

Recognizing the disadvantages encountered in the manufacture of carbon bisulphide in a large number of small retorts, such as just described, it has been proposed to carry out the reaction in larger retorts. In this procedure, oxygen is introduced into the reaction zone along with the sulphurous gas, and the amount of oxygen is controlled so as to support combustion of a sufficient amount of the carbon in the retort to generate heat necessary to maintain the reaction. The principal disadvantages inherent in such prior proposal are (1) consumption in the retort of a large amount of the relatively expensive carbon, e. g. wood charcoal, for purpose other than combination with sulphur, and (2) production of relatively large quantities of carbon oxysulphide, formation of which is substantially promoted by the presence of the oxygen of the air introduced into the system primarily to support combustion of carbon for heat generation. In the manufacture of carbon bisulphide, production of carbon oxysulphide is a troublesome feature and something to be avoided as much as possible on account of sulphur loss at COS and corresponding reduction of $CS_2$ yields.

One of the principal objects of the present invention is to provide a proces in which the reaction may be carried out in a large retort, and in which process the heat necessary is supplied internally of the retort zone but is furnished in such a way as to avoid any appreciable consumption of the expensive carbonaceous material for purposes of heat generation. To this end the invention aims to provide a method by which the heat necessary to maintain the endothermic reaction and to offset radiation heat losses may be supplied by burning under controlled conditions in a suitable producer or generator a relatively cheap form of fuel, e. g. metallurgical coke, to produce a hot carbon monoxide gas which is then introduced into the main $CS_2$ reaction zone in admixture with the sulphurous material constituting the source of sulphur in the process. The invention thus makes possible internal supply of heat to the reaction without consumption of expensive reactive form of carbon for generating heat, and use of a large cheaply built and maintained reaction retort.

In carrying out a preferred embodiment of the invention a relatively cheap form of carbonaceous material, e. g. metallurgical coke, is burned in a producer. Combustion of the coke is controlled so as to produce an initial hot carbon monoxide-nitrogen gas mixture containing substantially no free oxygen and a minimum practicable amount of carbon dioxide. Sulphur preferably in the form of vapor, produced in any suitable sublimer or vaporizer, is then introduced into the carbon monoxide gas. Generation of the hot carbon monoxide gas and the quantity of sulphur vapor introduced into the carbon monoxide gas are controlled so that after admixture of the hot carbon monoxide gas and the sulphur vapor, the temperature of the resulting gas mixture is high enough so that on contacting such resulting gas mixture with a suitable active type of carbon sufficient heat is present to cause the sulphur and carbon to combine to form carbon bisulphide. Such gas mixture is then introduced into a reaction zone and contacted with an active form of solid carbonaceous material, e. g. wood charcoal. The exit gas mixture of the reaction zone contains carbon bisulphide vapor, carbon monoxide, the nitrogen of the producer gas, some carbon oxysulphide, and possibly small amounts of carbon dioxide. The reaction zone exit gas is then contacted with an absorbent preferably of the kind capable of absorbing both carbon bisulphide and carbon oxysulphide, in this way separating the carbon bisulphide and carbon oxysulphide from the carbon monoxide, nitrogen, and other constituents of the reaction zone exit gas. The tail gas of the $CS_2$-COS absorption operation contains a relatively large amount of carbon monoxide having substantial heat generating capacity. Such tail gas is then burned, after introduction of supplemental air, in indirect heat exchange relation with the initial carbon monoxide-nitrogen producer gas to aid in raising the temperature thereof, preferably prior to admixture with the sulphur vapor.

The nature of the invention, the details, objects and advantages thereof may be more fully understood from a consideration of the following description taken in connection with the accompanying drawing illustrating, partly in section and partly diagrammatic, a plant layout of apparatus in which the process of the invention may be carried out.

Referring to the drawing, 10 indicates a hot CO gas producer comprising a steel shell 11 which may be lined with any suitable refractory heat-resistant material. The producer is provided with a grate 12 made of suitable material and arranged to support a relatively deep body of carbonaceous material 13 such as metallurgical coke. At the bottom of the producer, beneath grate 12, is an air inlet 15 and an ash clean-out opening 16. Mounted on top is a hopper 19 in which is maintained a supply of coke to be fed into the producer. The hopper may be equipped with a valve 20 constructed in any suitable way to permit introduction of coke into the producer without permitting discharge of gases.

The producer outlet main 22 opens into one end of a recuperator 24 provided with tube sheets 25 and 26 connected by a plurality of tubes 28. The recuperator shell, tube sheets, tubes, etc., may be made of suitable metallic material capable of withstanding prevailing temperatures. As shown in the drawing, the arrangement is such that the hot CO generator gases pass through tubes 28 while the CO tail gases of the subsequent $CS_2$-COS absorption operation are being burned in the space 29 surrounding tubes 28. The CO producer gas after having passed through the recuperator flows through a mixing pipe 33 opening into the top of reaction chamber 35. A sulphur vapor inlet conduit 36, controlled by valve 37 and connected at one end to a sulphur vaporizer not shown, opens into mixing pipe 33.

The construction of reaction chamber 35 may duplicate that of generator 10. Supported on grate 40 of the reaction chamber is a body 41 of active type of carbon such as charcoal, supply of which to the reaction chamber is maintained by hopper 43 and feed valve 44. The reaction chamber is connected by pipe 45 with a boiler 46.

In carrying out the process of the invention, producer 10 is substantially filled with relatively low-priced solid carbonaceous material, such as metallurgical coke. It is preferred to employ carbonaceous material containing little or no hydrocarbons since presence of hydrogen in the generator exit gas tends to form $H_2S$ in the subsequent $CS_2$ reaction. When starting up operations valve 37 in sulphur vapor line 36, valve 47 in line 45, and valve 47' in CO-$N_2$ gas return conduit 77 are closed, and valve 48 in by-pass line 48' is opened. The quantity of air charged into the generator by blower 51 from air inlet 52, controlled by valve 53 and the depth of the body of coke are regulated so that coke is burned to produce a hot gas mixture comprising chiefly CO and nitrogen, substantially no free oxygen, and only a small amount of carbon dioxide. Preferably, dried air is used so that the producer exit gas contains no hydrogen derived from moisture of the atmosphere, substantial absence of hydrogen being desirable to minimize formation of $H_2S$ in the subsequent carbon bisulphide production reaction. The producer is operated in substantially the same way as the well-known gas producers except that the air used is dried and no water is introduced into the generator. As is understood in the gas producer art, the producer gas may contain possibly 3% $CO_2$. For purposes of the present invention, the gas producer is operated so as to obtain in the gas as little $CO_2$ as practicable. From time to time, the supply of coke in the producer may be replenished as needed by operation of valve 20, and ash is withdrawn through opening 16.

The CO gas, leaving the producer through pipe 22 at temperatures upwards of about 1300–1450° F., flows through the recuperator, and into and through the carbonaceous material 41 in reaction chamber 35. Such gas then flows through by-pass line 48' and header 77 back into space 29 (surrounding tubes 28 in the recuperator) wherein the CO content of the gas is burned with suitable amount of supplemental air introduced through valve-controlled air inlet pipe 56. Heat generated in space 29 is transferred to the CO-$N_2$ gas mixture flowing through tubes 28. This procedure is continued until the body of carbon in reaction chamber 41 is thoroughly heated up to reaction temperature, say around 1475–1560° F. After passage of the CO-$N_2$ gas mixture in line 77 into recuperator space 29 and combustion of the CO therein are well under way, on account of the heat generated by such CO combustion, the temperature of the producer CO-$N_2$ gas stream in tube 28 is substantially increased so that thereafter the producer gases leave the recuperator and enter mixing pipe 33 at temperatures of say 1700–1900° F.

After the reaction chamber has been heated up to reaction temperature as described, valve 48 in by-pass line 48' is closed, and valves 37 in sulphur inlet pipe 36, valve 47 in line 45 and valve 47' in return gas line 77 are opened.

In the preferred form of the invention, suphur vapor is used as a source of sulphur because sulphur vapor may be readily obtained in a condition substantially free of oxygen, the presence of which tends to increase carbon oxysulphide production in reaction chamber 25. A stream of sulphur vapor may be generated in any suitable vaporizer or sublimer, not shown, and introduced in any suitable way into sulphur vapor inlet pipe 36. When controlling production of the $CO-N_2$ gas mixture in producer 10 as described and using sulphur vapor, the invention affords an efficient process since substantial absence of hydrogen and free oxygen in the system minimizes production of COS and $H_2S$ in reaction chamber 35.

While it is preferred to employ sulphur vapor as a source of sulphur, the principles of the invention may be also applied to utilization of sulphur dioxide gas as a source of sulphur. If sulphur dioxide is employed, such gas may be introduced into the system either thru inlet pipe 36 or, as subsequently explained, thru producer inlet 15. If sulphur dioxide gas is introduced thru inlet pipe 36, it is preferred to use a highly concentrated sulphur dioxide gas containing as little free oxygen and/or moisture as feasible. A suitable source of sulphur as sulphur dioxide gas is acid sludge formed in the sulphuric acid purification of hydrocarbon oils. Acid sludges may be destructively decomposed in the substantial absence of air by external heating in a suitable retort. The exit gas mixture of such retort comprises principally sulphur dioxide and water vapor, and smaller amounts of carbon dioxide and hydrocarbon vapors. This gas mixture may be cooled sufficiently, say to 100° F. or room temperature, to condense out most of the water and hydrocarbons. The resultant gas may have a sulphur dioxide concentration of 85 to approximately 100%. If desired, the $SO_2$ of the sludge gas may be absorbed in a suitable absorbent and separated from the absorbent by heating, in which case a substantially pure $SO_2$ gas is obtained. When $SO_2$ gases of the kind described or any other suitable $SO_2$ gases are employed as a source of sulphur, such gases should be dried before introducing the same into the system through pipe 36. Where $SO_2$ gas is employed it is desirable to preheat the same before introduction into pipe 36, for example by heat exchange with the hot gases discharged from space 29 in the recuperator.

Reaction chamber 35 is substantially filled with a body of solid carbonaceous material of a type sufficiently active for use in the manufacture of carbon bisulphide. Wood charcoal is a suitable material. Another sufficiently active type of carbonaceous material is acid sludge coke constituting the solid carbonaceous residue remaining in the retort after destructive decomposition of acid sludge as described above in connection with production of acid sludge $SO_2$ gas. Acid sludge coke resulting from low-temperature destructive decomposition of acid sludges usually contains a large amount, for example 30-40% of volatile matter, comprising chiefly hydrocarbons. This volatile matter may be driven off by heating at relatively high temperatures, e. g. 1200-1600° F., for a substantial period of time, say from 2 to 6 hours. Acid sludge coke if employed in the present process should contain preferably substantially no and in any event not more than about 3% volatile matter.

Assuming that sulphur vapor is being employed as a source of sulphur, the quantity of sulphur vapor introduced by regulation of valve 37 together with the temperature and quantity of the hot CO generator gas leaving recuperator 24 are so controlled that the temperature of the resulting gas mixture leaving mixing pipe 33 is sufficiently high to carry into the reaction zone in chamber 35 enough heat to maintain the endothermic combination of carbon and sulphur to produce carbon bisulphide and to offset losses of heat by radiation. Best yields of $CS_2$ may be obtained where temperatures prevailing in the reaction zone are about 1460-1560° F. On introduction into the reaction chamber of the hot sulphur-CO gas mixture from pipe 33, at the high temperatures prevailing, carbon and sulphur combine to form a reaction gas mixture comprising $CS_2$ vapor, CO, nitrogen, some COS, and possibly a small quantity of $CO_2$.

The gases leaving reaction chamber 35 are carried by pipe 45 to a waste heat boiler 46 where the gas temperature is reduced to about 1100° F. at which temperature the gases pass into the heat exchanger 60 used for preheating the $CO-N_2$ tail gases of absorber 70 prior to combustion of the CO in recuperator 24. The $CS_2$ gases after leaving transferrer 60 are carried by line 61 through oil preheater 64, cooled to about 300° F., and are desirably passed through another cooler 66 in which the gas temperature is reduced to about 100° F.

It has been found that straw oil constitutes a very suitable material for absorbing $CS_2$ and whatever COS may be contained in the furnace gases. Accordingly, exit gases of cooler 66 are passed into the bottom of a $CS_2$ and COS absorbing tower 70 over which absorbent straw oil is circulated. A supply of straw oil is maintained in tank 71 by circulating pump 73. Rate of downflow of oil through tower 70 is controlled by valve 75 so as to effect absorption of substantially all of the $CS_2$ and COS contained in the upwardly flowing furnace gases. The proper rate of flow of oil through tower 70 may be readily determined to suit any particular set of operating conditions. In this way substantially all of the $CS_2$ and COS of the gas stream become absorbed in the oil and are thus separated from most of the remaining furnace gases (principally CO and $N_2$ derived from generator 10), which are discharged from tower 70 into CO gas line 77.

The effluent oil in tower 70, containing absorbed $CS_2$ and COS, runs through line 79, preheater 64 and line 81, into $CS_2$ and COS stripping still 83. This stripper comprises a tower or column provided with means in the bottom for introduction of live steam and with any suitable refluxing arrangement in the upper part. Oil rich in absorbed $CS_2$ and COS is fed into the top of the stripper and steam, at temperatures of about 101° C. from boiler 46 and line 85 is introduced into the bottom of the stripper. Stripped oil runs from the bottom of tower 83 into a suitable separator 87 in which oil and condensed water are separated, and the separated oil, after cooling to about 100° F. in cooler 88, is returned by pump 73 to oil tank 71.

Steam, $CS_2$ vapor and COS gas discharged from the top of stripper 83, flow through line 90 and through two water-cooled condensers 91 and 92 connected in series. These coolers are operated so as to liquefy substantially all of the water and $CS_2$ vapor which together with the COS gas collect in a receiver or separator 95. If desired, condensers 91 and 92 may be refrigerated to effect maximum condensation of $H_2O$ and $CS_2$. In receiver 95, water and $CS_2$ are separated, the water being discharged to waste and the $CS_2$ run into $CS_2$ storage tank 96. Whatever COS may be discharged from separator 95 may be treated for recovery of sulphur or disposed of in any way not creating a nuisance. It is preferred to separate the COS out of the $CO-N_2$ gas in absorber 70 so as to avoid discharge of odorous sulphurous gases from the recuperator stack 97.

Activated carbon, for example "Norite" is also a satisfactory absorbent for both $CS_2$ and COS. If it is desired to use this material, the absorbed $CS_2$ and COS may be released by heating to say 105° C.

The $CO-N_2$ gas mixture in absorber exit pipe 77 is preheated in exchanger 60 to temperatures of say 600–800° F., such preheating aiding substantially in generation of large amounts of heat in space 29 of recuperator 24 to facilitate maintenance of the desired high temperatures in the reaction chamber 35.

When $SO_2$ gas is used as a source of sulphur, and such $SO_2$ is introduced through pipe 36, procedure is substantially the same as when using sulphur vapor, the major difference being that greater quantities of COS are formed on account of the presence of oxygen introduced as $SO_2$. However, the COS formed is separated from the reaction gases in the absorber 70 as described, and sulphur of the COS may be recovered by treatment of the COS discharged from separator 95 by any suitable known method.

However, when $SO_2$ is used as source of sulphur, it is preferred to introduce the $SO_2$ gas (which may be concentrated or diluted, e. g. with air) through producer inlet 15. In this modification, the $SO_2$, preferably dried, is in admixture with a sufficient amount of air, preferably dried, to support combustion of carbon of bed 13 the same as already described. While passing through coke bed 13, $SO_2$ is reduced to elemental sulphur, and the quantity of air admitted through inlet 15 is such that the exit gas of the producer comprises principally, CO, $N_2$, sulphur vapor, and small amounts of $CO_2$ and COS. The advantage of this procedure is that cheap carbon of bed 13 is used to reduce $SO_2$ to sulphur thus avoiding consumption of expensive carbon of bed 41 for this purpose and effecting an appreciable saving in operating costs.

In the appended claims the expression "sulphurous gas" is used to include sulphur vapor or sulphur dioxide or a mixture of these. The terms "active carbon" and "active carbonaceous material" are intended to define a carbon of the type of wood charcoal or acid sludge coke, which is sufficiently active to combine with sulphur to form carbon bisulphide.

I claim:

1. The method for making carbon bisulphide which comprises burning in a reaction zone solid inactive carbonaceous material to produce hot carbon monoxide gas, forming a mixture of said hot gas with sulphurous gas of the class consisting of sulphur vapor and sulphur dioxide, then contacting said gas mixture in a second reaction zone with solid active carbonaceous material to form carbon bisulphide, and utilizing sensible heat of the hot carbon monoxide gas to supply heat required for the carbon bisulphide reaction.

2. The method for making carbon bisulphide which comprises introducing into a reaction zone solid inactive carbonaceous material, burning said material to generate a hot carbon monoxide gas, forming a mixture of said hot gas with sulphurous gas of the class consisting of sulphur vapor and sulphur dioxide, regulating the temperature of said carbon monoxide gas so that the temperature of said mixture is sufficiently high that on contacting said mixture with an active carbon sufficient heat is present to effect formation of carbon bisulphide, introducing solid active carbonaceous material into a second reaction zone, contacting said gas mixture with said active solid carbonaceous material to effect combination of sulphur and carbon to form carbon bisulphide, and recovering carbon bisulphide.

3. The method for making carbon bisulphide which comprises introducing into a reaction zone solid inactive carbonaceous material, burning said material to generate an initial hot carbon monoxide gas, thereafter introducing into said gas a sulphurous gas of the class consisting of sulphur vapor and sulphur dioxide, regulating the temperature of said carbon monoxide gas so that the temperature thereof is such that after admixture with said sulphurous gas the temperature of the resulting gas mixture is sufficiently high that on contacting said resulting gas mixture with an active carbon sufficient heat is present to effect formation of carbon bisulphide, introducing into a second reaction zone solid active carbonaceous material, contacting said resulting gas mixture with said active material to effect combination of sulphur and carbon, thereby producing a reaction zone exit gas mixture comprising carbon bisulphide and carbon monoxide, separating carbon bisulphide from said exit gas mixture, recovering carbon bisulphide, and burning the carbon monoxide of said exit gas mixture in indirect heat exchange relation with said initial carbon monoxide gas.

4. The method for making carbon bisulphide which comprises introducing into a reaction zone solid inactive carbonaceous material, burning said material to generate a hot carbon monoxide gas, thereafter introducing sulphur vapor into said gas, regulating the temperature of said carbon monoxide gas so that the temperature thereof is such that after admixture with said sulphur vapor the temperature of the resulting gas mixture is sufficiently high that on contacting said resulting gas mixture with an active carbon sufficient heat is present to effect formation of carbon bisulphide, introducing into a second reaction zone solid active carbonaceous material, contacting said resulting gas mixture with said active material to effect combination of sulphur and carbon to form carbon bisulphide, and recovering carbon bisulphide.

5. The method for making carbon bisulphide which comprises introducing into a reaction zone solid inactive carbonaceous material, burning said material to generate an initial hot carbon monoxide gas, thereafter introducing sulphur vapor into said gas, regulating the temperature of said carbon monoxide gas so that the temperature thereof is such that after admixture with said sulphur vapor the temperature of the resulting gas mixture is sufficiently high that on contacting said resulting gas mixture with an active carbon sufficient heat is present to effect formation of carbon bisulphide, introducing into a second reaction zone solid active carbonaceous material, contacting said resulting gas mixture with said active material to effect combination of sulphur and carbon, thereby producing a reaction zone exit gas mixture comprising carbon bisulphide and carbon monoxide, separating carbon bisulphide from said exit gas mixture, recovering carbon bisulphide, and burning the carbon monoxide of said exit gas mixture in indirect heat exchange relation with said initial carbon monoxide gas.

6. The method for making carbon bisulphide which comprises introducing into a reaction zone solid inactive carbonaceous material, passing sulphur dioxide gas and free oxygen through a body of said material, regulating passage of sulphur dioxide and free oxygen through said body so as to effect combustion of said carbonaceous material to produce a gas mixture comprising principally carbon monoxide, nitrogen and sulphur vapor heated to temperatures at least sufficiently high to effect formation of carbon bisulphide, introducing into a second reaction zone solid active carbonaceous material, contacting said gas mixture with said active material to effect combination of sulphur and carbon to form carbon bisulphide, and recovering carbon bisulphide.

7. The method for making carbon bisulphide which comprises introducing into a reaction zone solid inactive carbonaceous material, burning said material to generate an initial hot carbon monoxide gas, thereafter introducing sulphur vapor into said gas, regulating the temperature of said carbon monoxide gas so that the temperature thereof is such that after admixture with said sulphur vapor the temperature of the resulting gas mixture is sufficiently high that on contacting said resulting gas mixture with an active carbon sufficient heat is present to effect formation of carbon bisulphide, introducing into a second reaction zone solid active carbonaceous material, contacting said resulting gas mixture with said active material to effect combination of sulphur and carbon, thereby producing a reaction zone exit gas mixture containing carbon bisulphide, carbon oxysulphide, and carbon monoxide, contacting the exit gas mixture with an absorbent under conditions to absorb carbon bisulphide and carbon oxysulphide and separate the same from the carbon monoxide, recovering the carbon bisulphide from the absorbent, and burning said carbon monoxide in indirect heat exchange relation with said initial carbon monoxide gas.

CHARLES FORBES SILSBY.